(12) United States Patent
Sugiyama et al.

(10) Patent No.: US 8,488,208 B2
(45) Date of Patent: Jul. 16, 2013

(54) OPTICAL MODULE, AN IMAGE READER AND AN ASSEMBLING METHOD OF AN OPTICAL MODULE

(75) Inventors: Namie Sugiyama, Shizuoka (JP); Keisuke Hatomi, Tokyo (JP); Hiroyuki Okada, Tokyo (JP)

(73) Assignee: NEC Engineering, Ltd., Tokyo (JP)

( * ) Notice: Subject to any disclaimer, the term of this patent is extended or adjusted under 35 U.S.C. 154(b) by 318 days.

(21) Appl. No.: 12/951,742

(22) Filed: Nov. 22, 2010

(65) Prior Publication Data

US 2011/0122457 A1  May 26, 2011

(30) Foreign Application Priority Data

Nov. 24, 2009  (JP) ................................ 2009-266143

(51) Int. Cl.
*H04N 1/40* (2006.01)
*H04N 1/04* (2006.01)
*H04N 1/46* (2006.01)
*G06K 1/00* (2006.01)
*G06F 3/12* (2006.01)

(52) U.S. Cl.
USPC ........... 358/448; 358/497; 358/471; 358/474; 358/1.9; 358/1.13; 358/475; 358/498; 358/509; 358/487

(58) Field of Classification Search
USPC ................. 358/448, 497, 1.9, 1.13, 475, 498, 358/509, 484, 474, 487
See application file for complete search history.

(56) References Cited

U.S. PATENT DOCUMENTS

| | | | |
|---|---|---|---|
| 2005/0219651 A1* | 10/2005 | Uchida et al. | 358/487 |
| 2007/0097454 A1* | 5/2007 | Kim | 358/474 |
| 2008/0018956 A1* | 1/2008 | Inoue | 358/474 |
| 2009/0015886 A1* | 1/2009 | Kim et al. | 358/484 |
| 2010/0245939 A1* | 9/2010 | Nakaie et al. | 358/474 |
| 2011/0096342 A1* | 4/2011 | Burke et al. | 358/1.9 |
| 2011/0096378 A1* | 4/2011 | Wang et al. | 358/498 |
| 2011/0157661 A1* | 6/2011 | Kim et al. | 358/475 |
| 2012/0281246 A1* | 11/2012 | Nagatani et al. | 358/1.13 |

FOREIGN PATENT DOCUMENTS

| | | |
|---|---|---|
| JP | 11-355530 A | 12/1999 |
| JP | 2003-295339 A | 10/2003 |
| JP | 2005-12832 A | 1/2005 |
| JP | 2005-198230 A | 7/2005 |
| JP | 2008-54201 A | 3/2008 |
| JP | 200927515 A | 2/2009 |
| JP | 2009-53323 A | 3/2009 |

OTHER PUBLICATIONS

Japanese Office Action dated Oct. 25, 2011 issued by the Japanese Patent Office in corresponding Japanese Application No. 2009-266143.

* cited by examiner

*Primary Examiner* — Charlotte M Baker
*Assistant Examiner* — Rury Grisham
(74) *Attorney, Agent, or Firm* — Sughrue Mion, PLLC

(57) ABSTRACT

An optical module 100 includes an optical path unit 101 including a plurality of reflectors 104 for securing an optical path of reflected light from a manuscript, an image processing unit 102 including a reading device 105 which reads image information on the manuscript based on the reflected light from the manuscript entered via the optical path, and a connecting component 103 which connects the optical path unit 101 and the image processing unit 102 so that their positional relation will become a prescribed state.

8 Claims, 19 Drawing Sheets

OPTICAL MODULE, AN IMAGE READER AND AN ASSEMBLING METHOD OF AN OPTICAL MODULE

INCORPORATION BY REFERENCE

This application is based upon and claims the benefit of priority from Japanese Patent Application No. JP 2009-266143, filed on Nov. 24, 2009, the disclosure of which is incorporated herein in its entirety by reference.

BACKGROUND OF THE INVENTION

1. Technical Field

The present invention relates to an optical module widely used for an image processing apparatus such as a copier and a scanner, an image reader including the optical module concerned and an assembling method of an optical module.

2. Background Art

An image reader such as a copier and a scanner are always requested to be miniaturized and to cut cost. An image reader includes an optical module which reads image information from a manuscript arranged on a platen glass. A general optical module reads image information from an image by reciprocating along a guide rail arranged under a manuscript. Further, a mechanism to let an optical module reciprocate is disclosed, for example, in patent document 1 (Japanese Patent Application Laid-Open No. 2003-295339).

An optical module is described. FIG. 20 shows an example of a lateral sectional view of a general optical module. In FIG. 20, there is a light source 12 which irradiates a reading surface of a manuscript 11 above an optical module 10. In FIG. 20, the light source 12 is a stick type illuminant whose longitudinal direction is vertical to a sheet. Hereinafter, a direction vertical to a sheet is described as a main scanning direction.

A linear ray of light emitted from the light source 12 irradiates the manuscript 11 along a main scanning direction. Reflected light 13 from the manuscript 11 enters a first reflective mirror 15 arranged in a housing 14. Then, a ray of light reflected by a reflective mirror 15 enters an optical lens unit 19 via a second to a fourth reflective mirror 16-18. A ray of light 20 emitted from the optical lens unit 19 forms an image on a CCD (Charge Coupled Device) 21, and image information on the manuscript 11 is read line by line. Further, in order to set an optical path with a high degree of accuracy, a reflective mirror group 15-18, the optical lens unit 19 and the CCD 21 are generally arranged in an housing together.

Here, because the length of a single line of the manuscript 11 is larger than the length of a detection length of the CCD 21, an optical path length from the manuscript 11 to the optical lens unit 19 needs to be set longer compared with an optical path length from the optical lens unit 19 to a reading surface of a CCD 21. Also, in the housing 14, an optical path needs to be set avoiding the optical lens unit 19. In order to avoid the optical lens unit 19 and set a long optical path, a plurality of reflective mirrors 15-18 need to be arranged separately in left, right, above or below, and the housing 14 becomes large.

Accordingly, patent document 2 (Japanese Patent Application Laid-Open No. 2005-198230) discloses a technology which lowers a height of a housing by arranging separately a plurality of reflective mirrors on one side of an optical lens unit and a CCD on the other side. FIG. 21 shows a lateral sectional view of an optical module disclosed in patent document 2. In FIG. 21, in a housing 14B, a plurality of reflective mirrors 15B-18B are arranged on one side of an optical lens unit 19B, and a CCD 21B on the other side. When a plurality of reflective mirrors 15B-18B are arranged together on one side of the optical lens unit 19B, an optical path need not be set avoiding the optical lens unit 19B. In this case, a plurality of reflective mirrors 15B-18B can be arranged within a fixed height. Accordingly, a height of the housing 14B can be made low. Further, also in FIG. 21, in order to set an optical path with a high degree of accuracy, a plurality of reflective mirrors 15B-18B, the optical lens unit 19B and the CCD 21B are arranged within the housing 14B together.

SUMMARY

The object of the present invention is to provide a small sized optical module, an image reader including the optical module and an assembling method of an optical module which can secure a sufficient optical path length and can set an optical path with a high degree of accuracy.

An optical module includes an optical path unit including a plurality of reflectors for securing an optical path of reflected light from a manuscript, an image processing unit including a reading device which reads image information on the manuscript based on the reflected light from the manuscript entered via the optical path, and a connecting component which connects the optical path unit and the image processing unit so that their positional relation will become a prescribed state.

An image reader includes the above-described optical module, a first and a second smoothing component fastened to one end part of the optical module, and a guide rail arranged between the first and second smoothing component. Here, the first and second smoothing component hold the guide rail in between cooperatively.

An assembling method of an optical module according for an exemplary object of the invention includes connecting a first holding component that holds a plurality of reflectors for securing an optical path of reflected light from a manuscript to a connecting component, and connecting a second holding component that holds a reading device which reads image information on the manuscript based on the reflected light from the manuscript entered via the optical path to a connecting component so that a positional relation between the optical path and the reading device becomes a prescribed state.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

The First Exemplary Embodiment

Figure 1:
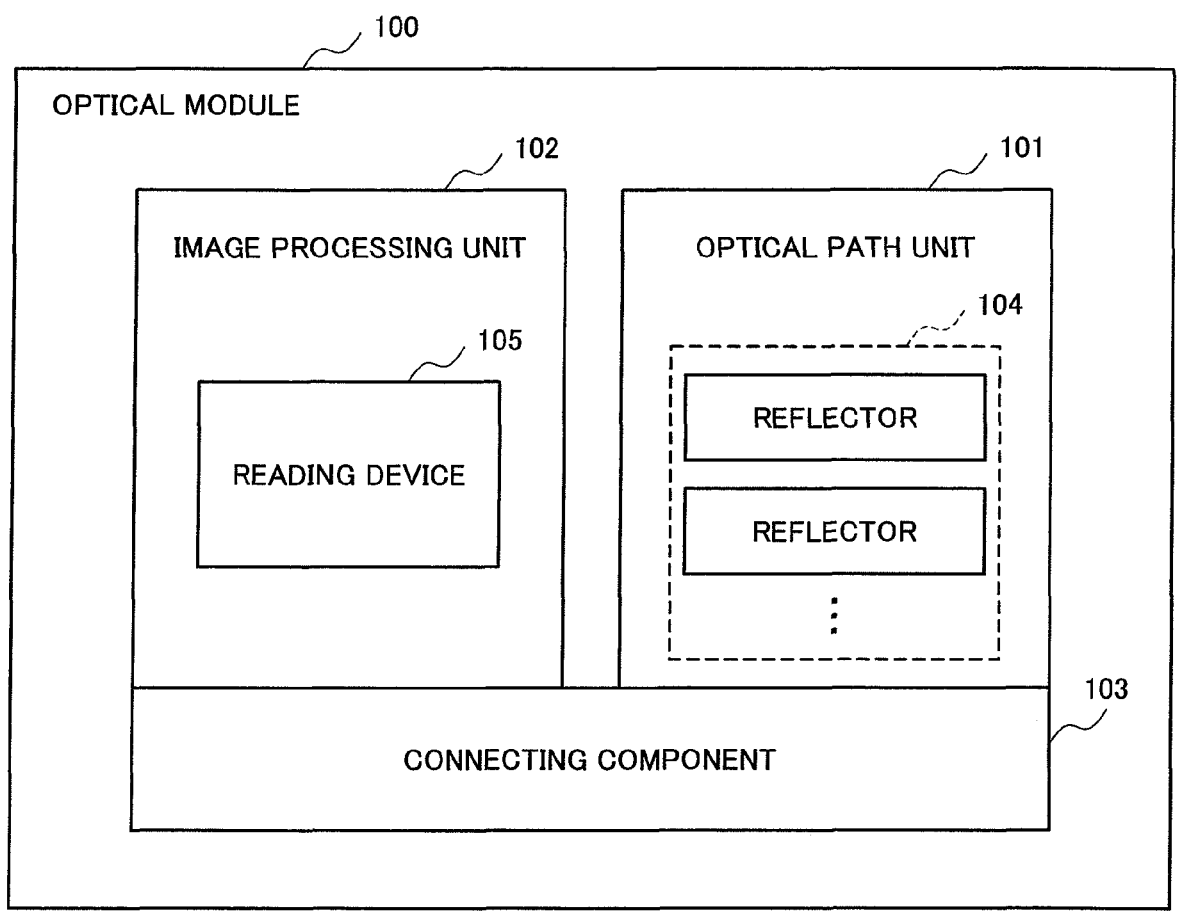
FIG. 1 is an example of a block diagram of an optical module 100 according to the first exemplary embodiment of the present invention.

The first exemplary embodiment of the present invention is described. FIG. 1 is an example of a block diagram of an optical module according to this exemplary embodiment. An optical module 100 according to this exemplary embodiment includes an optical path unit 101, an image processing unit 102 and a connecting component 103.

The optical path unit 101 has a plurality of reflectors 104 for securing an optical path of reflected light from a manuscript. The image processing unit 102 includes a reading device 105 which reads image information on a manuscript. The reading device 105 reads image information on the manuscript based on reflected light from the manuscript entered via an optical path in the optical path unit 101. The connecting component 103 connects the optical path unit 101 and the image processing unit 102 so that their positional relation will be in a prescribed state.

When the optical path unit 101 and the image processing unit 102 are formed independently, a plurality of reflectors 104 can be arranged relatively free within the optical path unit 101, and the optical path unit 101 can be miniaturized in a state of securing a sufficient optical path length. Also, by positioning the optical path unit 101 and the image processing unit 102 on the connecting component 103 respectively, light emitted from the optical path unit 101 can be entered at a desired position of the image processing unit 102 with a high degree of accuracy.

Accordingly, a small sized optical module capable of securing a sufficient optical path length and setting an optical path with a high degree of accuracy can be provided.

The Second Exemplary Embodiment

Figure 2:
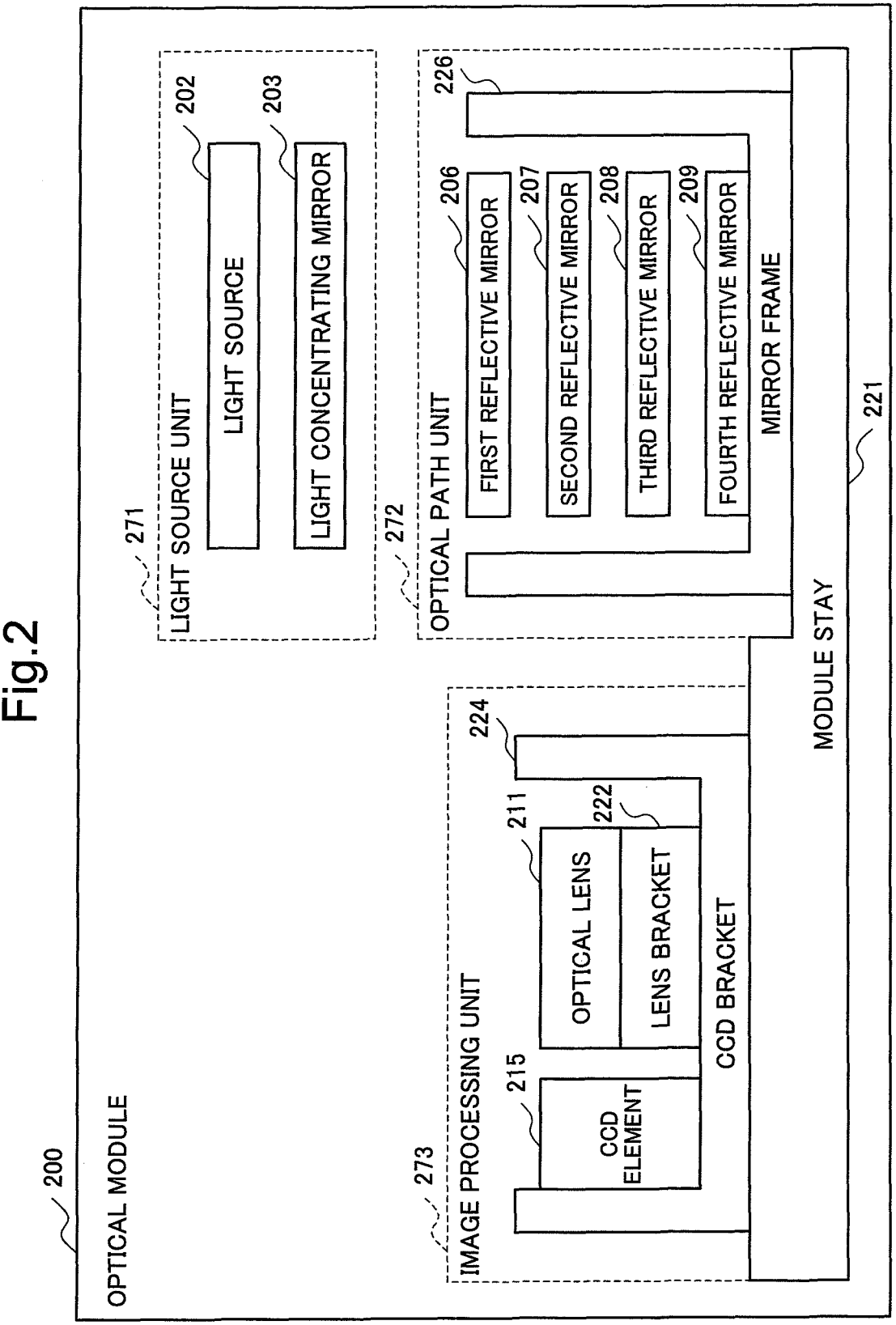
FIG. 2 is an example of a block diagram of an optical module 200 according to the second exemplary embodiment of the present invention.

The second exemplary embodiment of the present invention is described. FIG. 2 is an example of a block diagram of an optical module according to this exemplary embodiment. An optical module 200 according to this exemplary embodiment includes a light source unit 271, an optical path unit 272, an image processing unit 273 and a module stay 221. Here, the module stay 221 corresponds to a connecting component of a claim.

The light source unit 271 includes a light source 202 and a light concentrating mirror 203. The light source 202 is a stick type illuminant which irradiates a reading surface of a manuscript with a linear light from underneath. The light concentrating mirror 203 is a mirror of long length which is arranged in a position opposing the light source 202, and concentrates light emitted from the light source 202 on a reading surface of a manuscript.

The optical path unit 272 includes a first to a fourth reflective mirror 206-209 and a mirror frame 226. The optical path unit 272 reflects light which is emitted from the light source unit 271 and reflected by the manuscript successively by a first to a fourth reflective mirror 206-209. Then, after a sufficient optical path is secured, reflected light from the manuscript is emitted to the image processing unit 273. The mirror frame 226 is positioned on the module stay 221 in a state of holding a first to a fourth reflective mirror 206-209.

The image processing unit 273 includes an optical lens 211, a lens bracket 222, a CCD element 215 and a CCD bracket 224. The optical lens 211 concentrates light entered from the optical path unit 272 on the CCD element 215. The CCD element 215 analyzes reflected light from the manuscript entered via the optical path unit 272 and the optical lens unit 211 and reads image information on the manuscript. The lens bracket 222 is positioned on the module stay 221 in a state of holding the optical lens 211. The CCD bracket 224 is positioned on the module stay 221 in a state of holding the CCD substrate 221.

Figure 3:
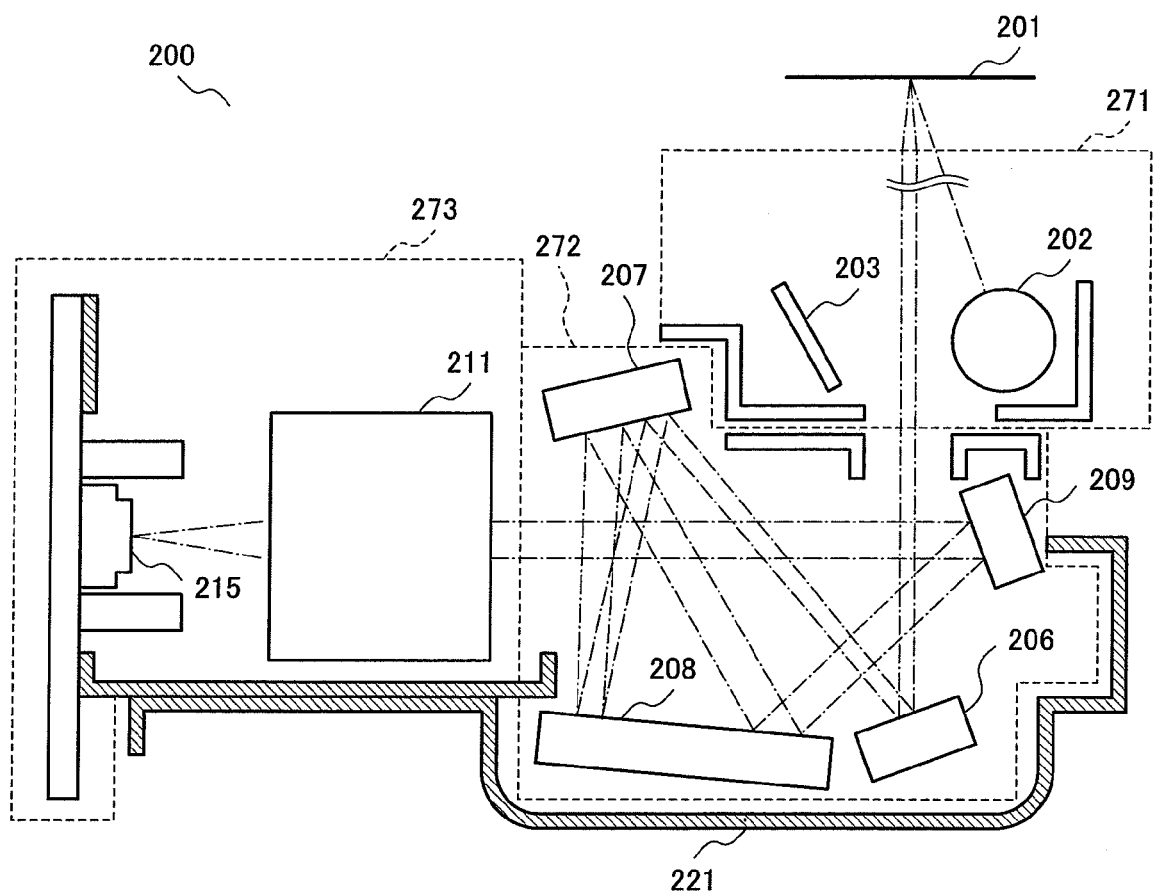
FIG. 3 is an example of a lateral sectional view of an optical module 200 according to the second exemplary embodiment of the present invention.

FIG. 3 shows an example of a lateral sectional view of the optical module 200 according to this exemplary embodiment. A ray of light emitted from the light source 202 is concentrated by the light concentrating mirror 203 on a reading surface of a manuscript 201. The concentrated ray of light is reflected by the manuscript 201 and enters the first reflective mirror 206. A ray of light reflected by the first reflective mirror 206 is concentrated on the CCD element 215 via a second to a fourth reflective mirror 207-209 and the optical lens 211. The CCD element 215 analyzes reflected light from the manuscript 201 entered via the optical path unit 272 and the optical lens 211 and reads image information on the manuscript 201.

Here, the light source unit 271 extends in a vertical direction to a sheet. The optical module 200 including the light source unit 271 reads image information on a whole surface of the manuscript 201 by reciprocating on a guide rail which is not illustrated in a horizontal direction of a sheet. Hereinafter, a long length direction of the light source unit 271 is described as a main scanning direction and a movement direction of the optical module 200 as a secondary scanning direction.

Here, a number of reflective mirrors arranged in the optical path unit 272 and their arrangement can be set appropriately. According to this exemplary embodiment, a first to a fourth four reflective mirrors 206-209 are arranged as follows. That is, as shown in FIG. 3, the first and the third reflective mirror, 206 and 208, are arranged below an optical axis of the optical lens 211, the second reflective mirror 207 above the optical axis of the optical lens 211, and the fourth reflective mirror 209 on an extension of the optical axis of the optical lens 211 respectively. Further, the second reflective mirror 207 and the third reflective mirror 208 reflect light twice each using both sides of the mirrors. By so arranging, in the optical path unit 272, a sufficient optical path length can be secured. Also, because an optical path need not be set so that the optical lens 211 may be avoided, the first to the fourth reflective mirror 206-209 can be arranged relatively free in the optical path unit 272, and the optical path unit 272 can be miniaturized.

Figure 4:
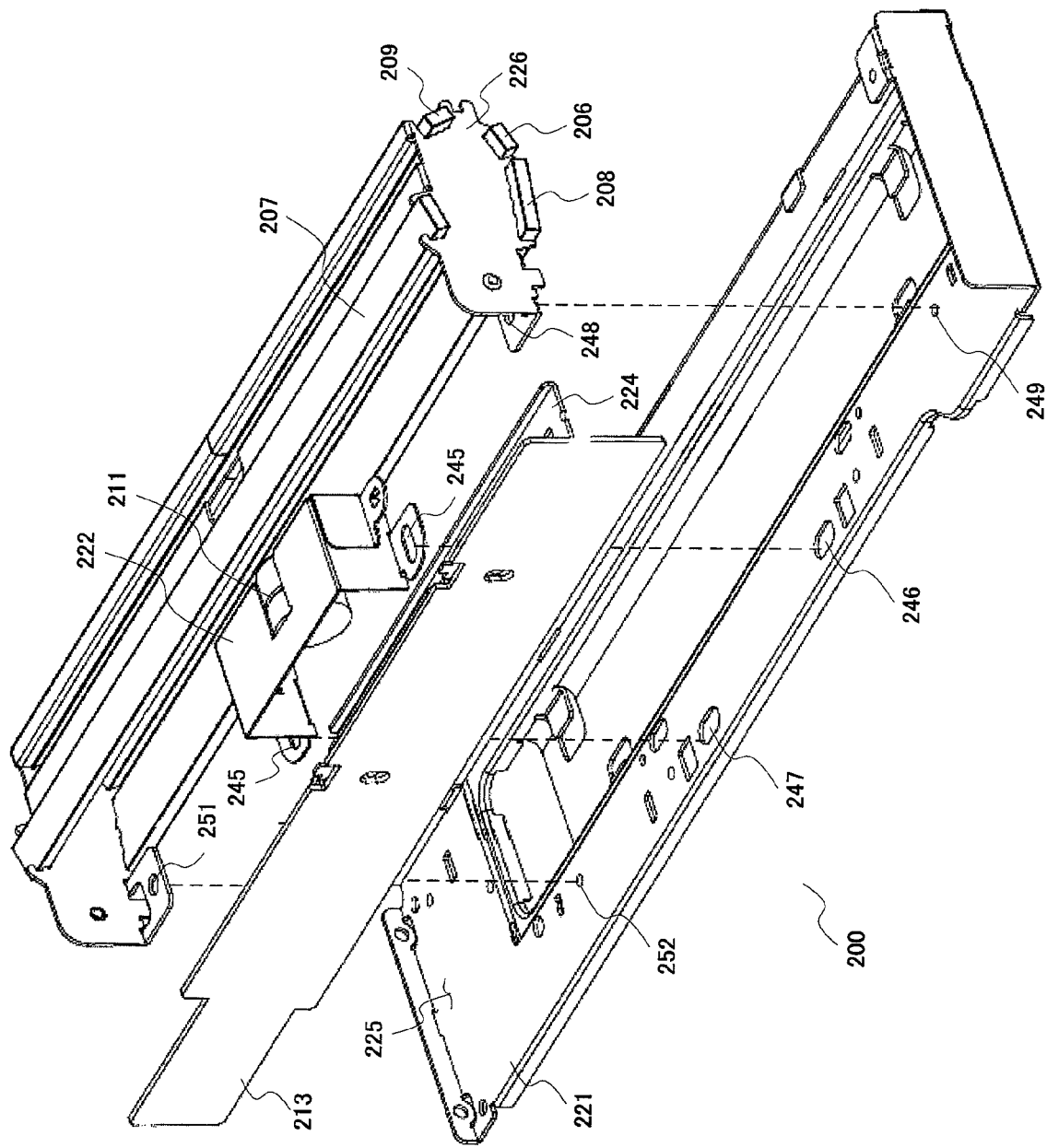
FIG. 4 is an example of an exploded perspective view of an optical module 200 according to the second exemplary embodiment of the present invention.

Next, positioning the mirror frame 226, the lens bracket 222 and the CCD bracket 224 on the module stay 221 is described. FIG. 4 shows an example of an exploded perspective view of the optical module 200. In this exemplary embodiment, the module stay 221 is formed out of sheet metal and includes on an upper surface a reference surface 225 which becomes a standard for positioning. The reference surface 225 is a plane parallel to a plane formed by the optical module 200 moving in the secondary scanning direction. The mirror frame 226, the lens bracket 222 and the CCD bracket 224 are connected to the reference surface 225.

That is, the mirror frame 226 is fixed with screws on end side of the reference surface 225 in a state of holding the first to the fourth reflective mirror 206-209. The mirror frame 226 and the reference surface 225 are fixed with screws via screw holes 248 and 251 of the mirror frame 226 and screw holes 249 and 252 on the reference surface 225.

On the other hand, the lens bracket 222 which holds the optical lens 211 and the CCD bracket 224 which holds the CCD element 215 are fixed with screws on the other end side of the reference surface 225. The lens bracket 222 and the reference surface 225 are fixed with screws via elongated screw holes 244 and 245 of the lens bracket 222 and elongated screw holes 246 and 247 on the reference surface 225. Similarly, the CCD bracket 224 and the reference surface 225 are fixed with screws via elongated screw holes 216 and 217 (refer to FIG. 8) of the CCD bracket 224 and elongated screw holes 246 and 247 formed as elongated holes on the reference surface 225.

Figure 5:
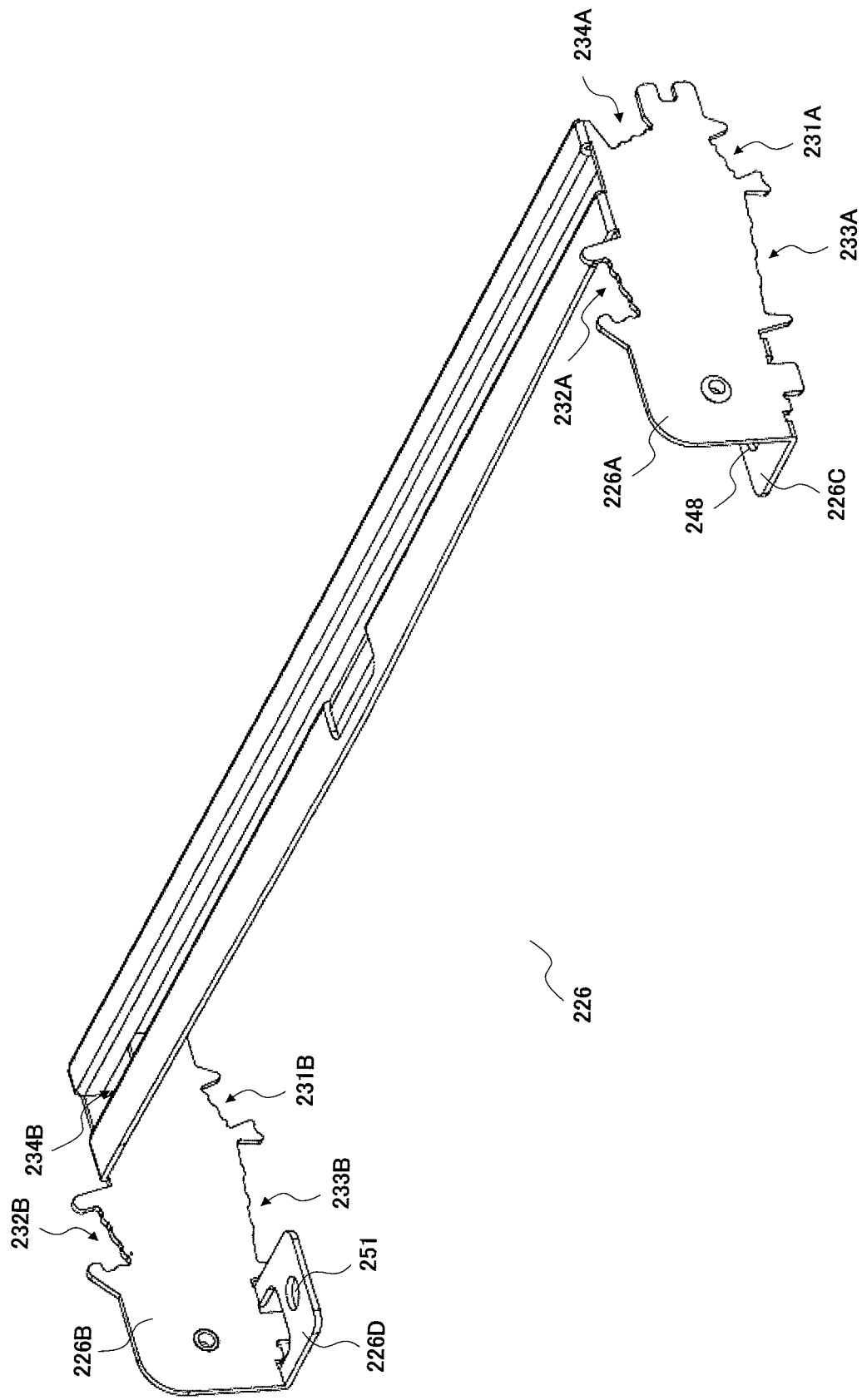
FIG. 5 is an example of a perspective view of a mirror frame 226 according to the second exemplary embodiment of the present invention.

The mirror frame 226, the lens bracket 222 and the CCD bracket 224 are described respectively. First, the mirror frame 226 is described. FIG. 5 shows an example of a perspective view of the mirror frame 226. The mirror frame 226 is formed by bending sheet metal in a U shape. Bottom parts of mirror fixing parts 226A and 226B in left and right are further bent respectively perpendicularly towards inside. And screw holes 248 and 251 are formed in the bent parts. The mirror frame 226 is fixed to the module stay 221 using screw holes 248 and 251 of the mirror frame 226 and screw holes 249 and 252 of the module stay 221.

Figure 6:
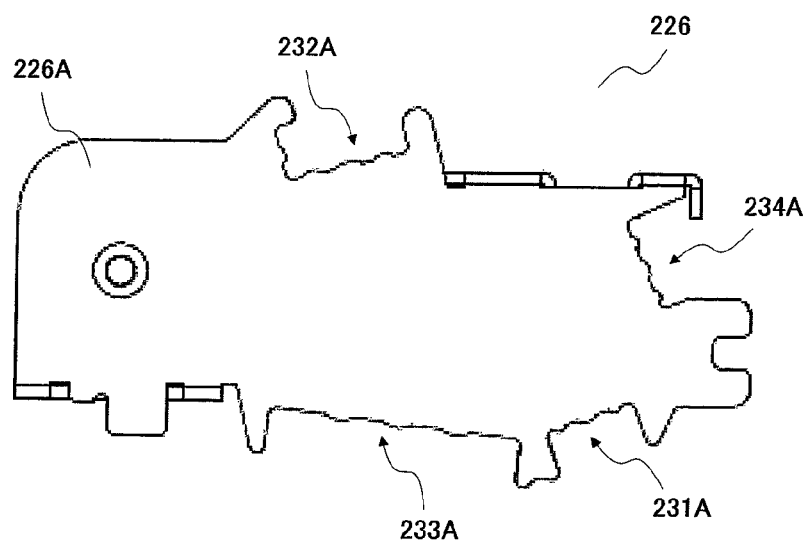
FIG. 6 is an example of a side view of a mirror frame 226 according to the second exemplary embodiment of the present invention.

In FIG. 5, in mirror fixing parts 226A and 226B in left and right, first to fourth cutout parts 231A-234A and 231B-234B are formed in a corresponding position respectively. The first reflective mirror 206 is held between first cutout parts 231A and 231B. Similarly, the second to the fourth reflective mirror 207-209 are held respectively between second to fourth cutout parts 232A-234A and 232B-234B. As a reference, an example of a side view of the mirror frame 226A is shown in FIG. 6.

By fixing the mirror frame 226 which holds the first to the fourth reflective mirror 206-209 on the module stay 221 using screw holes 248 and 251, the first to the fourth reflective mirror 206-209 are positioned to the module stay 221 with high accuracy. Moreover, when the mirror frame 226 with a complicated shape is applied, by fixing on the module stay 221, a precision can be secured easily.

Figure 7:
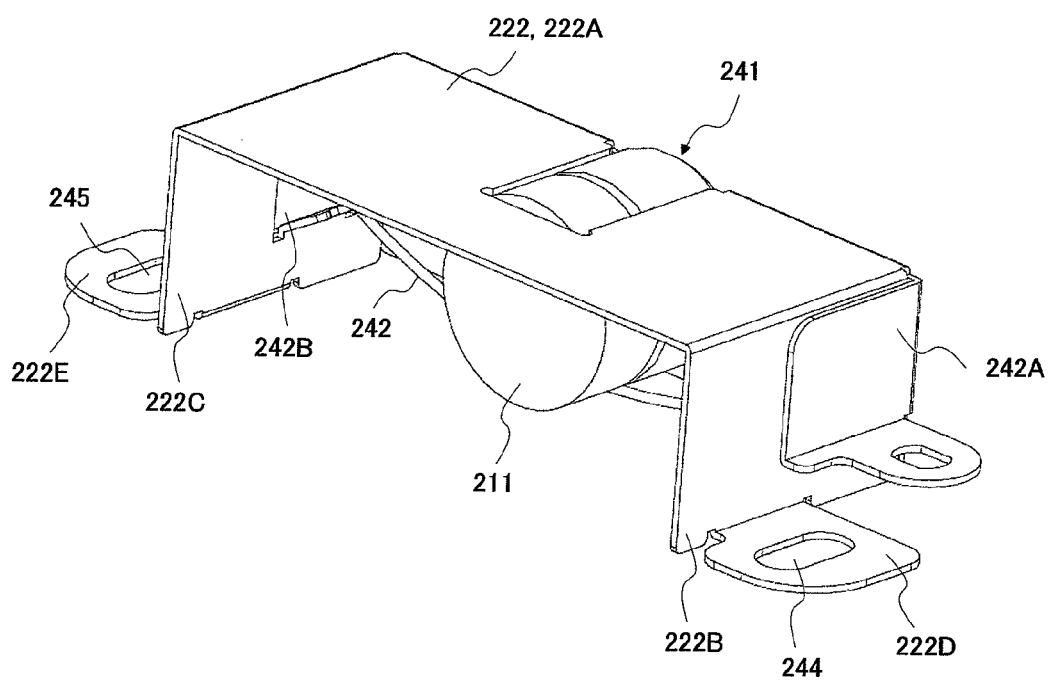
FIG. 7 is an example of a perspective view of a lens bracket 222 in a state of holding an optical lens 211.

Next, the lens bracket 222 is described. FIG. 7 shows an example of a perspective view of the lens bracket 222 in a state of holding the optical lens 211. The lens bracket 222 is formed by bending sheet metal in a U shape. On an upper surface 222A, a notch 241 is formed for sticking out a part of the optical lens 211. On the other hand, bottom parts of wall surfaces 222B and 222C in left and right are further bent perpendicularly towards outside. Elongated screw holes 244 and 245 are formed on the bent part.

Elongated screw holes 244 and 245 are formed elongated in an optical axis direction of the optical lens 211 in order to adjust a focus position on an optical path of the optical lens 211 when the lens bracket 222 is screwed to the module stay 221.

In FIG. 7, a bottom part of a cylinder shaped optical lens 211 is pressed by a spring material 242. The optical lens 211, by being pressed upwards and its part being stuck out through a notch 241, can be positioned with high accuracy in the lens bracket 222 in a direction of height.

Figure 8:
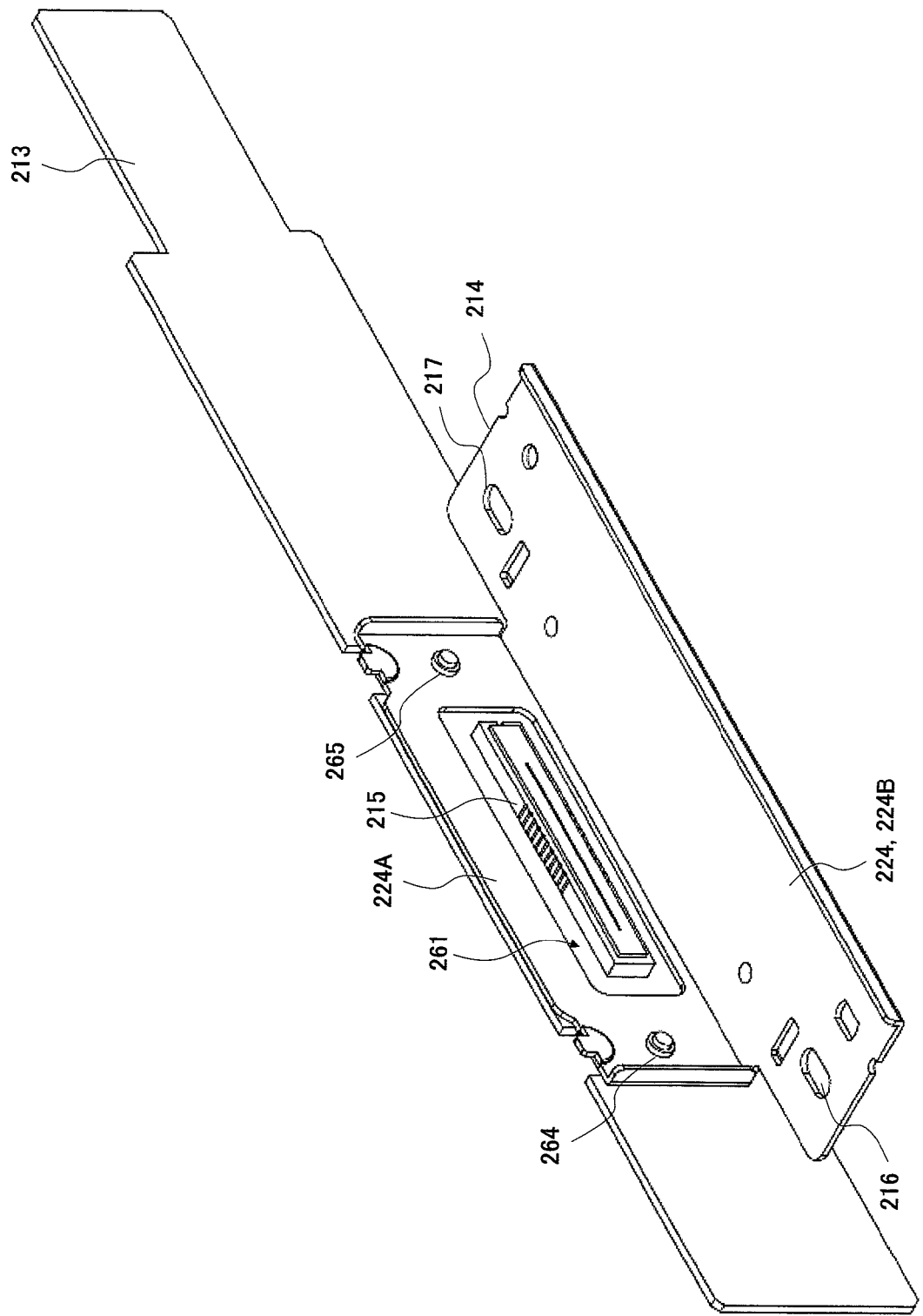
FIG. 8 is an example of a perspective view of a CCD bracket 224 seen from inside, in a state of installing a CCD substrate 213.
Figure 9:
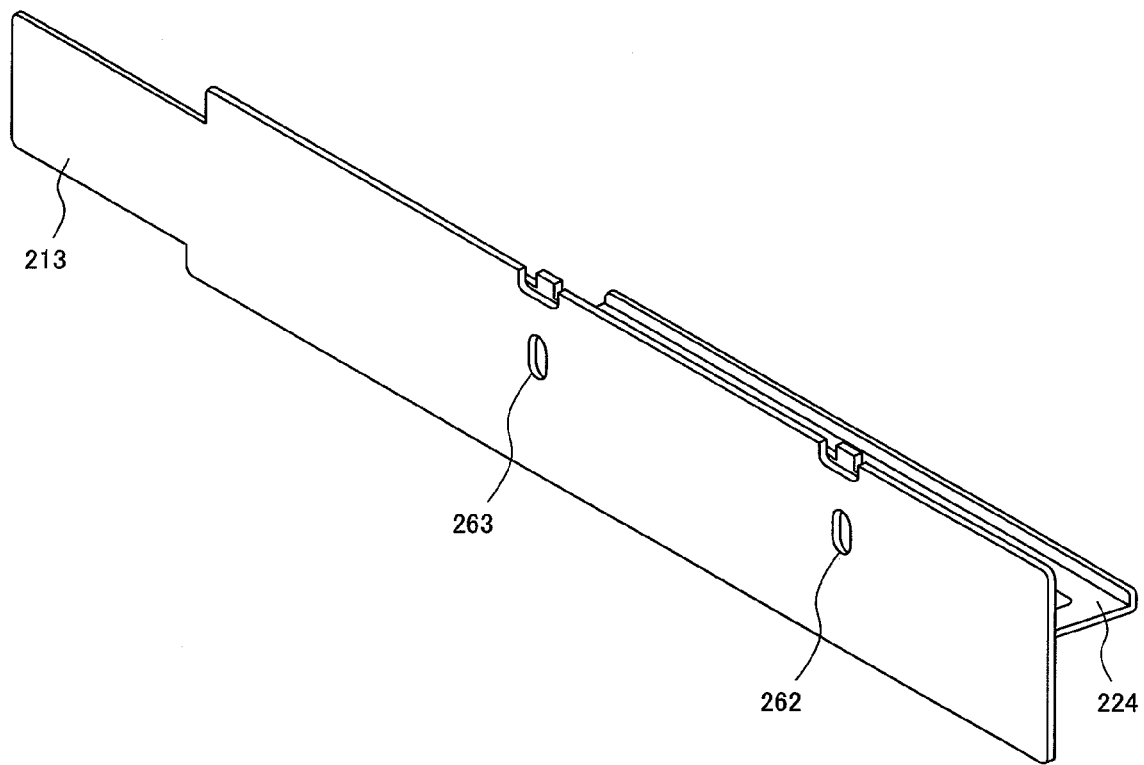
FIG. 9 is an example of a perspective view of a CCD bracket 224 seen from outside, in a state of installing a CCD substrate 213.

Finally, the CCD bracket 224 is described. FIG. 8 shows an example of a perspective view seen from inside of the CCD bracket 224 in a state of installing the CCD element 215, and FIG. 9 shows an example of a perspective view seen from outside. In this exemplary embodiment, the CCD element 215 is fixed to the CCD bracket 224 via a CCD substrate 213. In FIG. 8, the CCD bracket 224 is formed by bending sheet metal like a character L. An opening 261 for inserting the CCD element 215 is formed on a vertical board part 224A. Elongated screw holes 216 and 217 are formed on a horizontal board part 224B. Elongated screw holes 216 and 217 are formed longer in a left to right direction of the CCD element 215 in order to adjust so that a center of the CCD element 215 and a center of an optical path coincide when the CCD bracket 224 is screwed to the module stay 221.

On the other hand, as shown in FIG. 9, elongated screw holes 262 and 263 are formed on the CCD substrate 213 on which the CCD element 215 is installed. Elongated screw holes 262 and 263 are formed longer in a vertical direction in order to arrange the CCD element 215 at a desired height on the CCD bracket 224. Fixing the CCD substrate 213 to the CCD bracket 224 is performed as follows. After inserting the CCD element 215 into the opening 261 of the CCD bracket 224, a height of the CCD element 215 is adjusted. The CCD substrate 213 is fixed to the CCD bracket 224 using screws 264 and 265 in that state.

Next, positioning the lens bracket 222 and the CCD bracket 224 on the module stay 221 is described. The lens bracket 222 and the CCD bracket 224 are positioned on the module stay 221 using elongated screw holes 244 and 245 (FIG. 7), elongated screw holes 216 and 217 (FIG. 8) and elongated screw holes 246 and 247 (FIG. 4). That is, because elongated screw holes 244 and 245 of the lens bracket 222 are formed longer in an optical axis direction of the optical lens 211, fine adjustment of a distance between the optical lens 211 and the CCD element 215 is made. Also, because elongated screw holes 216 and 217 of the CCD bracket 224 are formed longer in a longitudinal direction of the CCD element 215, fine adjustment is made so that a center of the CCD element 215 and a center of the optical path coincide.

As stated above, when the lens bracket 222 and the CCD bracket 224 are fixed respectively on the module stay 221, each of a distance between the optical lens 211 and the CCD element 215 and a center position of the CCD element 215 can be adjusted independently.

Here, in this exemplary embodiment, the module stay 221, the mirror frame 226, the lens bracket 222 and the CCD bracket 224 are formed out of sheet metal respectively. Because thermal expansion rate of metal is remarkably smaller compared with that of resin, by forming these out of sheet metal, influence by thermal fluctuation can be ignored practically.

For example, when the module stay 221, the mirror frame 226, the lens bracket 222 and the CCD bracket 224 are formed out of resin material, they expand by thermal fluctuation. When the first reflective mirror 206 tilts 1 degree due to thermal expansion, visual line fluctuates for about 3 mm. Here, visual line points a position of a ray of light which finally enters the CCD element 215. On the other hand, when the module stay 221, the mirror frame 226, the lens bracket 222 and the CCD bracket 224 are formed out of sheet metal, actual measurement of a change in a visual line by thermal fluctuation is no more than 0.3 mm and can be ignored practically.

Further, when a thermal shock is given, angles of a plurality of reflective mirrors 206-209 change rapidly. In this case, even after returning to a normal temperature, several reflective mirrors may not return to their original positions completely, and a visual line remains being changed.

As mentioned above, the optical module 200 according to this exemplary embodiment forms the optical path unit 272 and the image processing unit 273 independently. In this case, in the optical path unit 272, an optical path need not be set so that the optical lens 211 may be avoided, and the first to the fourth reflective mirror 206-209 can be arranged in the optical path unit 272 relatively free. Accordingly, the optical path unit 272 can be miniaturized in a state of securing a sufficient optical path length of reflected light from the manuscript 201, and the optical module 200 can be miniaturized.

Further, by connecting the lens bracket 222 holding the optical lens 211 and the CCD bracket 224 holding the CCD element 215 to the module stay 221 respectively, fine adjustment of positions of the optical lens 211 and the CCD element 215 can be made respectively. Accordingly, an optical path can be set with a high degree of accuracy.

Also, when the optical module 200 is divided into three units, the light source unit 271, the optical path unit 272 and the image processing unit 273, adjusting each unit independently is enough, and an efficiency of assembly work of the optical module 200 improves substantially. Further, making each unit a light shielding structure is enough, and the optical module 200 need not be formed as a light shielding structure as a whole.

The Third Exemplary Embodiment

The third exemplary embodiment is described. According to this exemplary embodiment, an image reader in which an optical module 200 described in the second exemplary embodiment is included is applied. Hereinafter, same codes as the second exemplary embodiment are used for the optical module 200.

Figure 10:
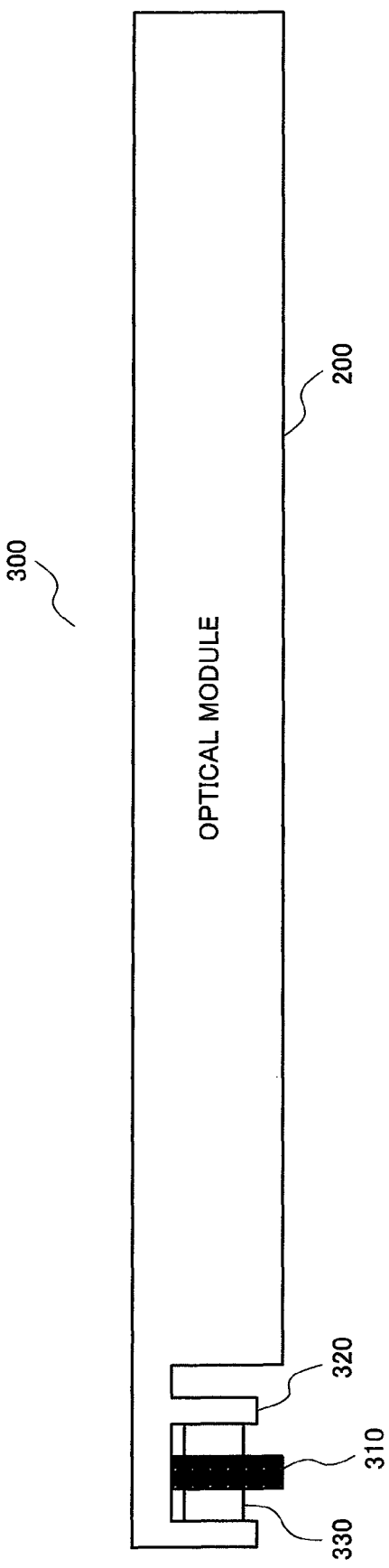
FIG. 10 is an example of a partial block diagram of an image reader 300 according to the third exemplary embodiment of the present invention.

FIG. 10 shows an example of a partial block diagram of an image reader according to this exemplary embodiment. In FIG. 10, an image reader 300 according to this exemplary embodiment includes the optical module 200, a guide rail 310, a first smoothing component 320 and a second smoothing component 330.

The optical module 200 is same as the one described in the second exemplary embodiment, so description about the optical module 200 is omitted. The guide rail 310 is a rail which extends in a vertical direction to a sheet of FIG. 10. The first smoothing component 320 and the second smoothing component 330 are fixed to the optical module 200 and hold the guide rail 310 in between cooperatively.

By applying aforementioned structure, the optical module 200 reciprocates along the guide rail 310 in a vertical direction to the sheet. Further, by installing the first and the second smoothing component 320 and 330 on one side of the optical module 200 and moving one side of the optical module 200 along the guide rail 310, space-saving of the image reader 300 can be achieved.

The Fourth Exemplary Embodiment

The fourth exemplary embodiment is described. In this exemplary embodiment also, an image reader in which an optical module 200 described in the second exemplary embodiment is included is applied. Hereinafter, same codes as the second exemplary embodiment are used for the optical module 200.

Figure 11:
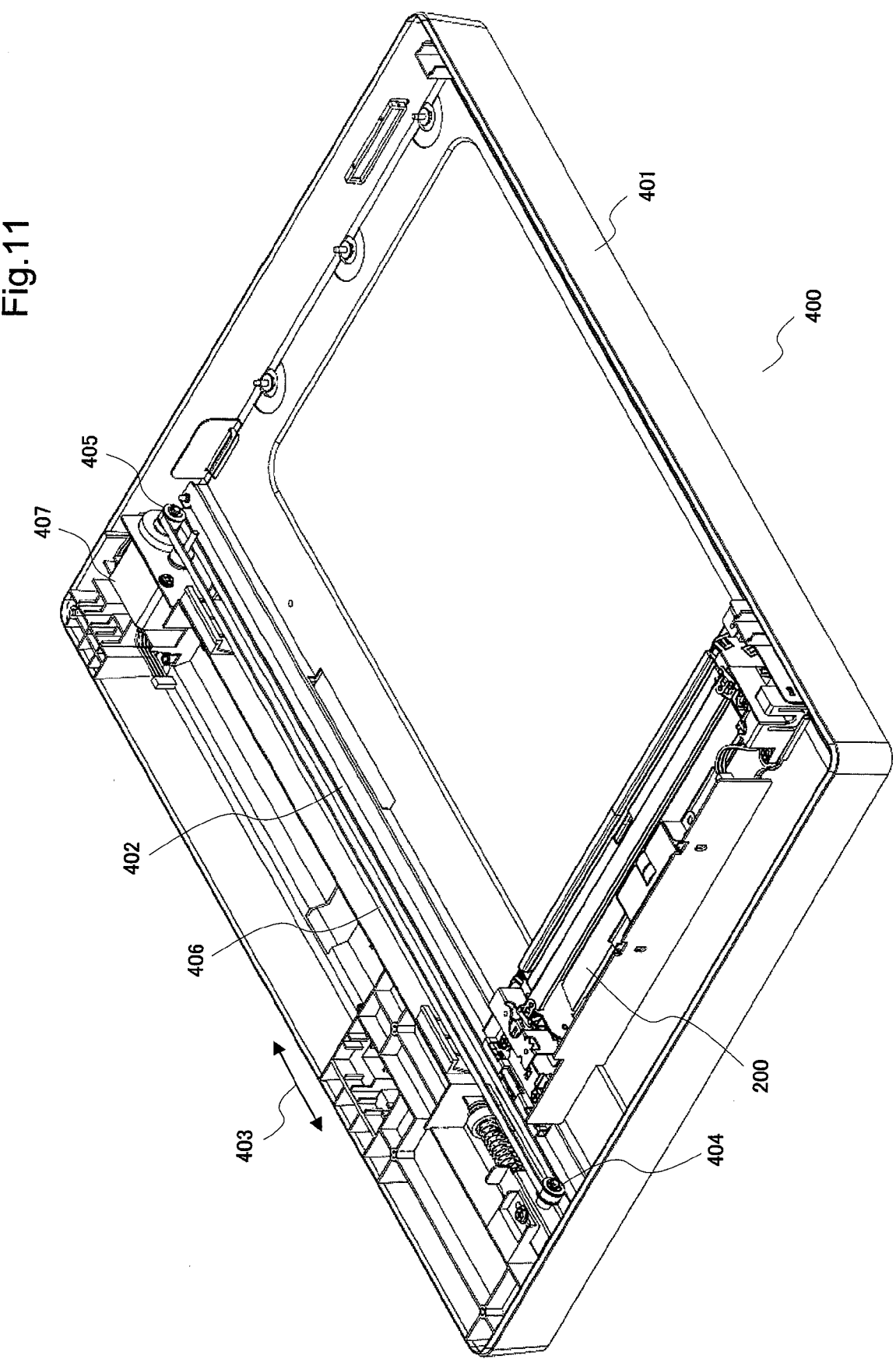
FIG. 11 is an example of a perspective view showing an internal structure of an image reader 400 according to the fourth exemplary embodiment of the present invention.

FIG. 11 shows an example of a perspective view of an internal structure of an image reader according to this exemplary embodiment. In FIG. 11, an image reader 400 includes the optical module 200, a guide rail 402, belt pulleys 404 and 405, a driving belt 406 and a motor 407 or the like which are arranged in a box type main body 401. Also, a platen for placing a manuscript is arranged under a not illustrated platen cover in the image reader 400.

In this exemplary embodiment, the guide rail 402 is arranged in a direction of an arrow 403. The guide rail 402 is connected to one end of the optical module 200. The driving belt 406 rotates by transmitting a turning force of the motor 407 via belt pulleys 404 and 405. Further, a part of the driving belt 406 is fastened to the optical module 200. Accordingly, by a rotation of the driving belt 406, the optical module 200 moves in a direction of the arrow 403 along the guide rail 402. Hereinafter, a direction in which the optical module 200 moves is described as a secondary scanning direction.

Figure 12:
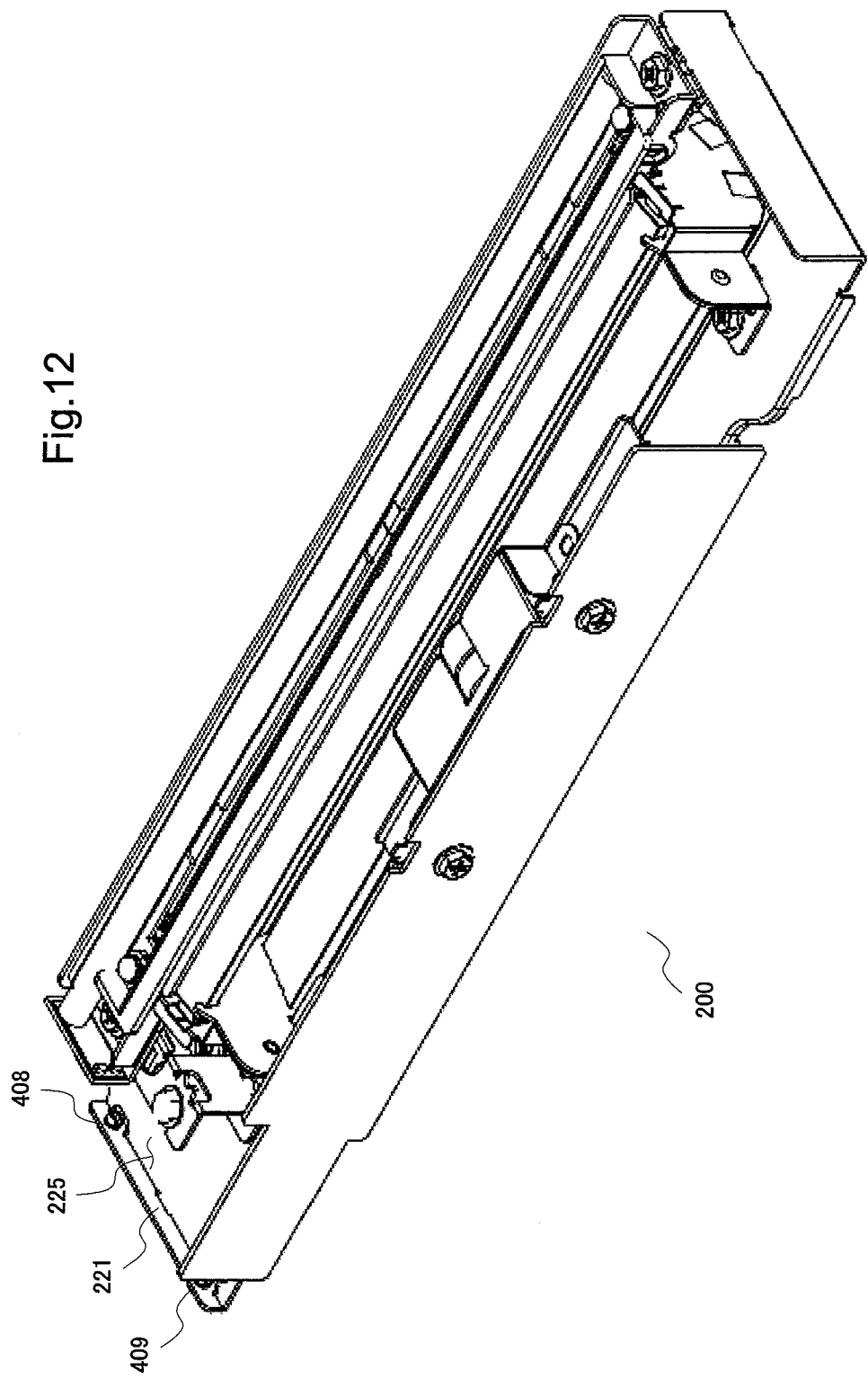
FIG. 12 is an example of a perspective view of an optical module 200 according to the fourth exemplary embodiment of the present invention.
Figure 13:
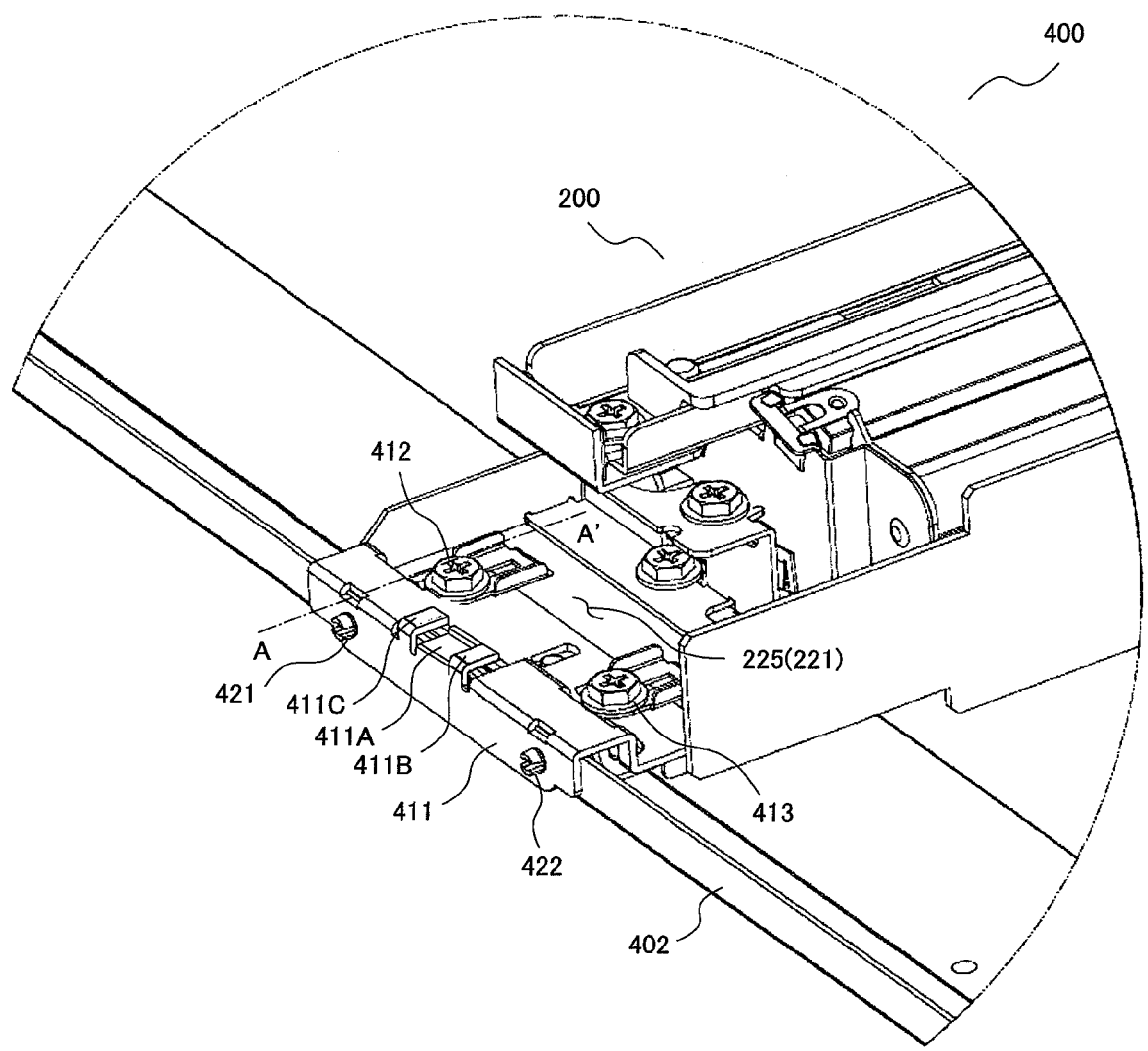
FIG. 13 is an example of a partial expanded perspective view of an image reader 400 according to the fourth exemplary embodiment of the present invention.

Connecting method of the optical module 200 and the guide rail 402 is described. FIG. 12 shows an example of a perspective view of the optical module 200 used in this exemplary embodiment and FIG. 13 shows an example of a partial perspective view of a connecting part for the optical module 200 and the guide rail 402.

In FIG. 12, two sliders 408 and 409 are installed with prescribed space in between on one side wall of a short side of a module stay 221 of the optical module 200. Also in FIG. 13, a guide bracket 411 is fixed to an end part of the module stay 221 on which sliders 408 and 409 are installed. According to this exemplary embodiment, the guide bracket 411 whose section has a shape of a turned down ladle is used. The guide bracket 411 is fixed to the module stay 221 using two screws 412 and 413. In this exemplary embodiment, by bending a central part of the guide bracket 411 at higher position than both side parts, three arms 411A, 411B and 411C are formed. Arms 411A, 411B and 411C are described later.

In this exemplary embodiment, the guide bracket 411 is fixed to the optical module 200 covering sliders 408 and 409 shown in FIG. 12. Then, sliders 421 and 422 are installed on an outer surface of the guide rail 402 of the guide bracket 411, in positions corresponding to sliders 408 and 409. Sliders 421, 422 and sliders 408, 409 hold the guide rail 402 in between respectively and cooperatively.

Figure 14:
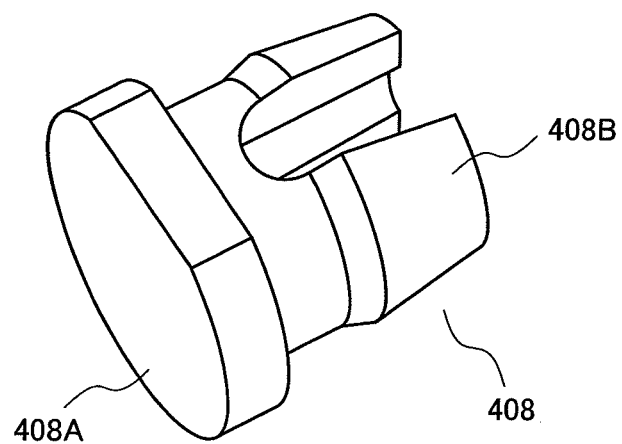
FIG. 14 is an example of a perspective view of a slider 408 according to the fourth exemplary embodiment of the present invention.
Figure 15:
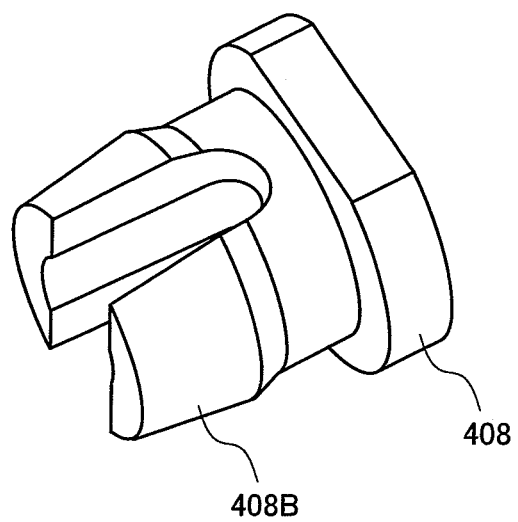
FIG. 15 is an example of a perspective view of a slider 408 seen from a different direction from FIG. 14.

Sliders 408, 409, 421 and 422 are described. FIG. 14 and FIG. 15 show examples of a perspective view which sees the slider 408 from two different directions. In this exemplary embodiment, the slider 408 is formed out of nylon resin and includes a slide surface 408A and an elastic body 408B which transforms in a radial direction. By bending the elastic body 408B in a radial direction and inserting it into a hole formed in the module stay 221, the slider 408 is fastened to the module stay 221. Other sliders 409, 421 and 422 are also formed into identical shapes using same material as the slider 408. By holding two separate positions on the guide rail 402 in between with two slide surfaces respectively, the optical module 200 moves smoothly and stably along the guide rail 402.

Further, a slider can be formed out of material other than nylon. Also, fastening of the slider is not limited to the above-mentioned method. The slider can be fixed to the module stay 221 and the guide bracket 411 by adhering, screwing or the like.

Figure 16:
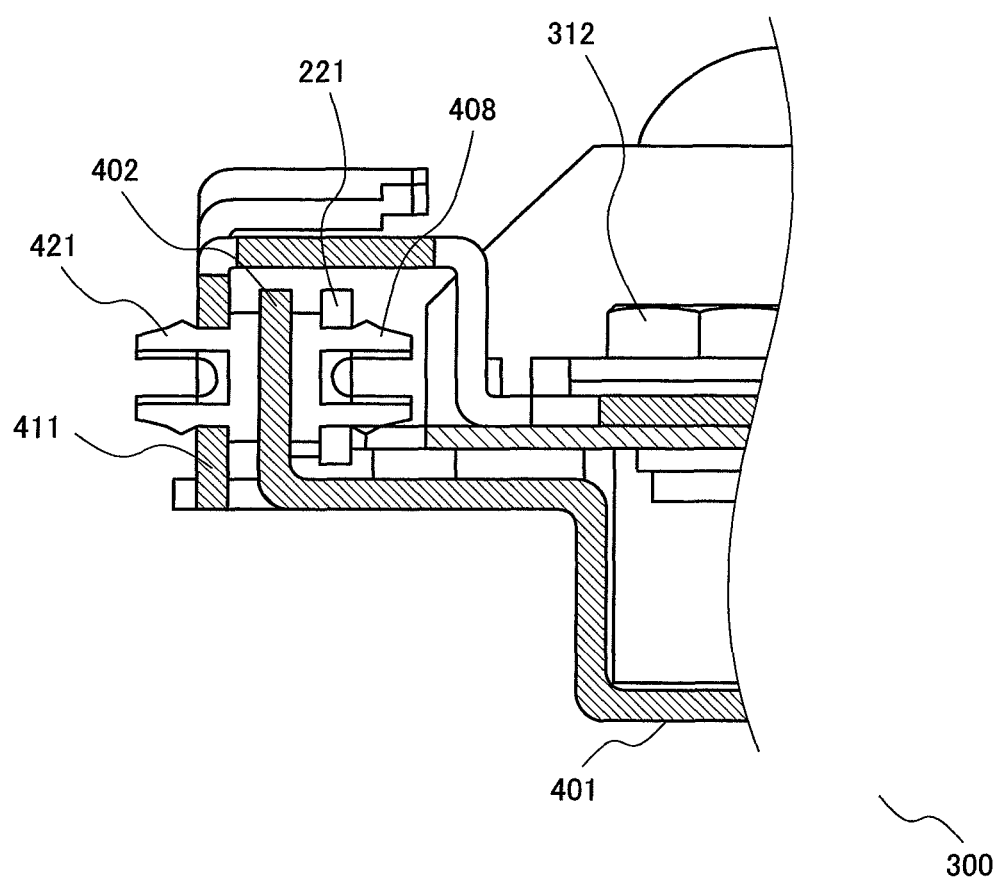
FIG. 16 is an example of a partial sectional view along the line A-A' of an image reader 400 shown in FIG. 13.

A procedure which connects the optical module 200 to the guide rail 402 is described. FIG. 16 shows a partial sectional view along the line A-A' of the image reader 400 shown in FIG. 13 and FIG. 17 shows a partial back view which sees the image reader 400 shown in FIG. 13 from below.

As shown in FIG. 16, in this exemplary embodiment, the guide rail 402 is formed by bending a part of a baseboard of the main body 401 of the image reader 400 upwards in an L character shape. By forming the guide rail 402 using a part of a baseboard of the main body 401, cost of the image reader 400 can be made low.

Figure 17:
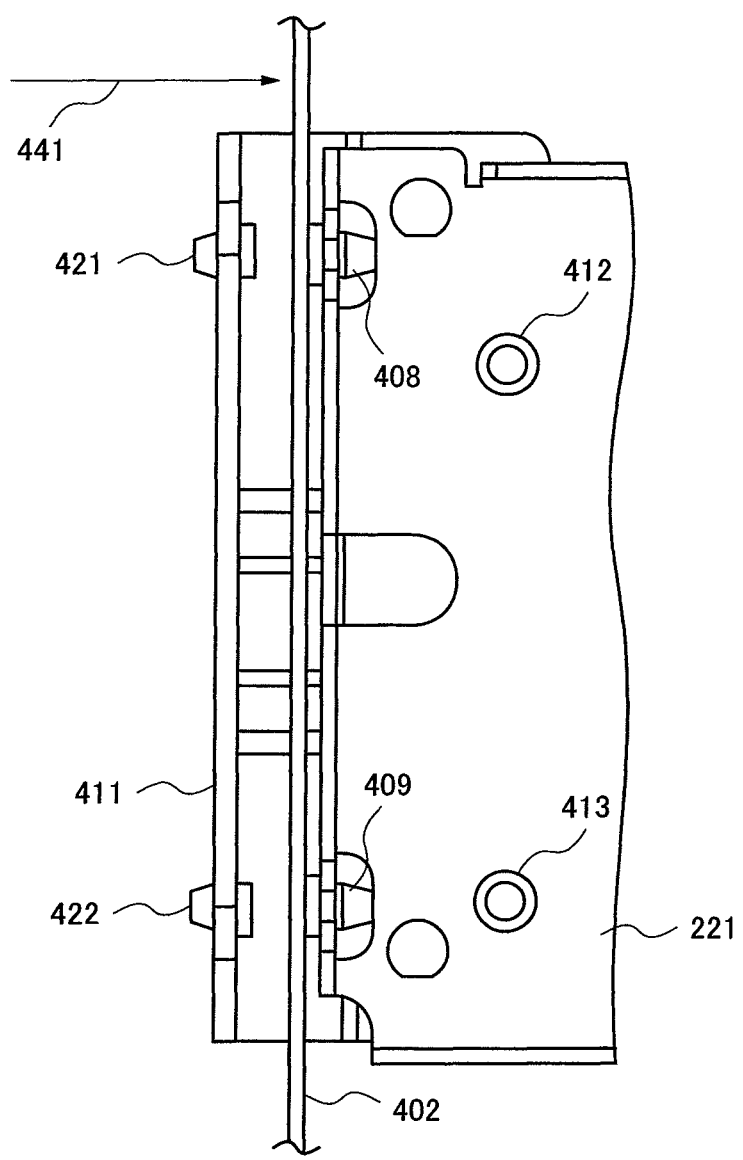
FIG. 17 is an example of a partial back view of an image reader 400 according to the fourth exemplary embodiment of the present invention.

In FIG. 17, the guide rail 402 is arranged between two sets of slider pairs (421, 408 and 422, 409) installed on the optical module 200 directly and via the guide bracket 411. After that, the guide bracket 411 is moved (arrow 441) so that a distance between opposing sliders will become a prescribed distance. The guide bracket 411 is fixed to the module stay 221 by screws 412 and 413 once a state in which a distance between sliders becomes a prescribed distance is attained. As a result, the guide rail 402 is held between opposing sliders (421, 408 and 422, 409).

By a procedure indicated above, the guide rail 402 and the optical module 200 can be connected easily.

Figure 18:
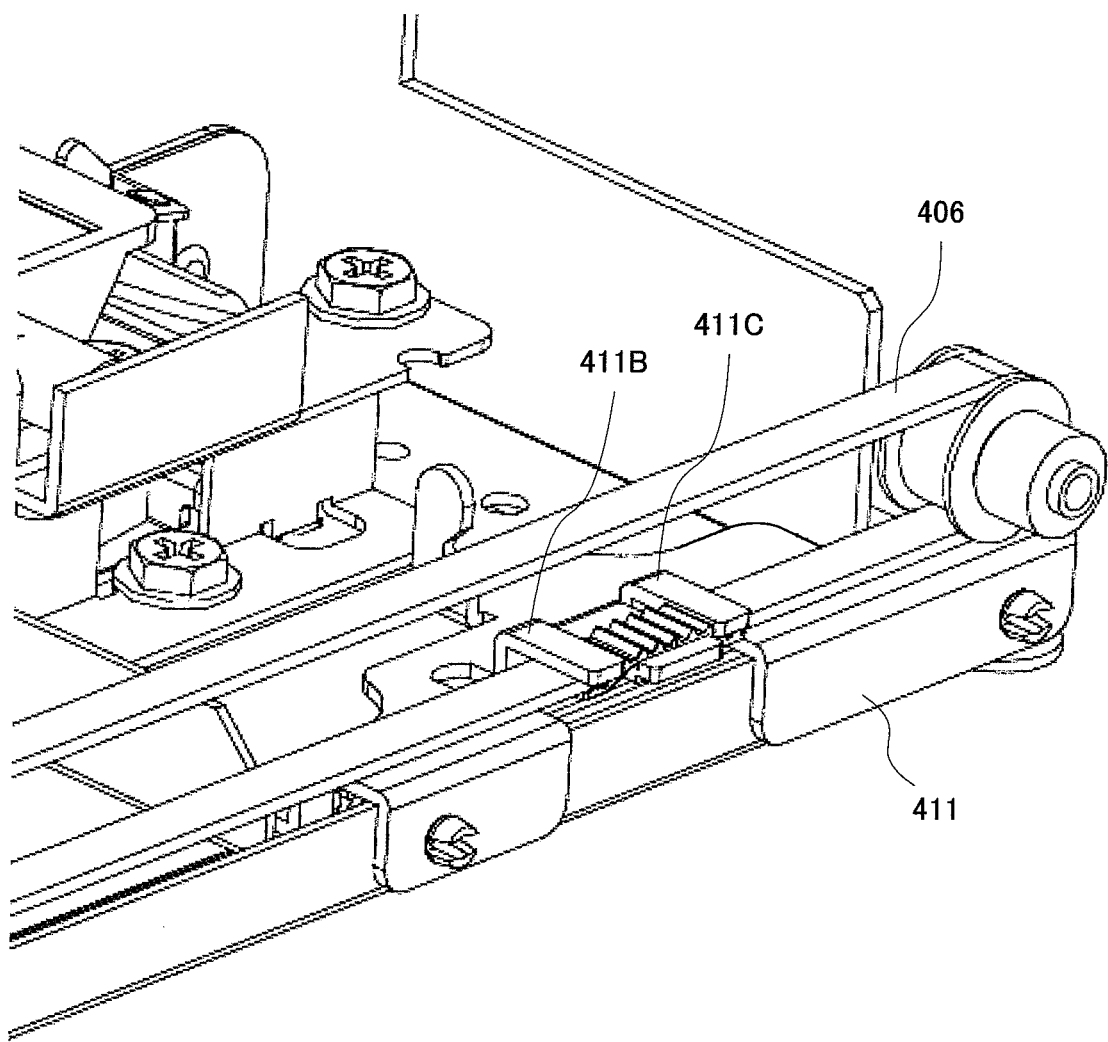
FIG. 18 is an example of a partial perspective view of a part which includes a driving belt 406 of an image reader 400 according to the fourth exemplary embodiment of the present invention.

Next, a moving mechanism of the optical module 200 is described. FIG. 18 shows an example of a partial perspective view of a moving mechanism for a part including a driving belt 406. Further, FIG. 18 is a perspective view which sees a connecting part of the optical module 200 shown in FIG. 13 from the optical module 200 side in a state of including the driving belt 406.

In FIG. 18, by bending a central part of the guide bracket 411 at higher position than both side parts, three arms 411A, 411B and 411C are formed. The arm 411A is formed into a concave so that the driving belt 406 does not fall off. The arm 411B and the arm 411C are bent at higher position than the arm 411A. By arranging the driving belt 406 in a concave part of the arm 411A, and pressing the driving belt 406 from above by the arm 411B and the arm 411C, the driving belt 406 is held on the optical module 200. Further, it is desirable for the driving belt 406 that a center line of the driving belt 406 and a center line of the guide rail 402 are arranged to coincide with a vertical direction of the image reader 400.

By holding the driving belt 406 using three arms 411A, 411B and 411C, the optical module 200 moves in the secondary scanning direction along the guide rail 402 with a rotation of the driving belt 406.

Figure 19:
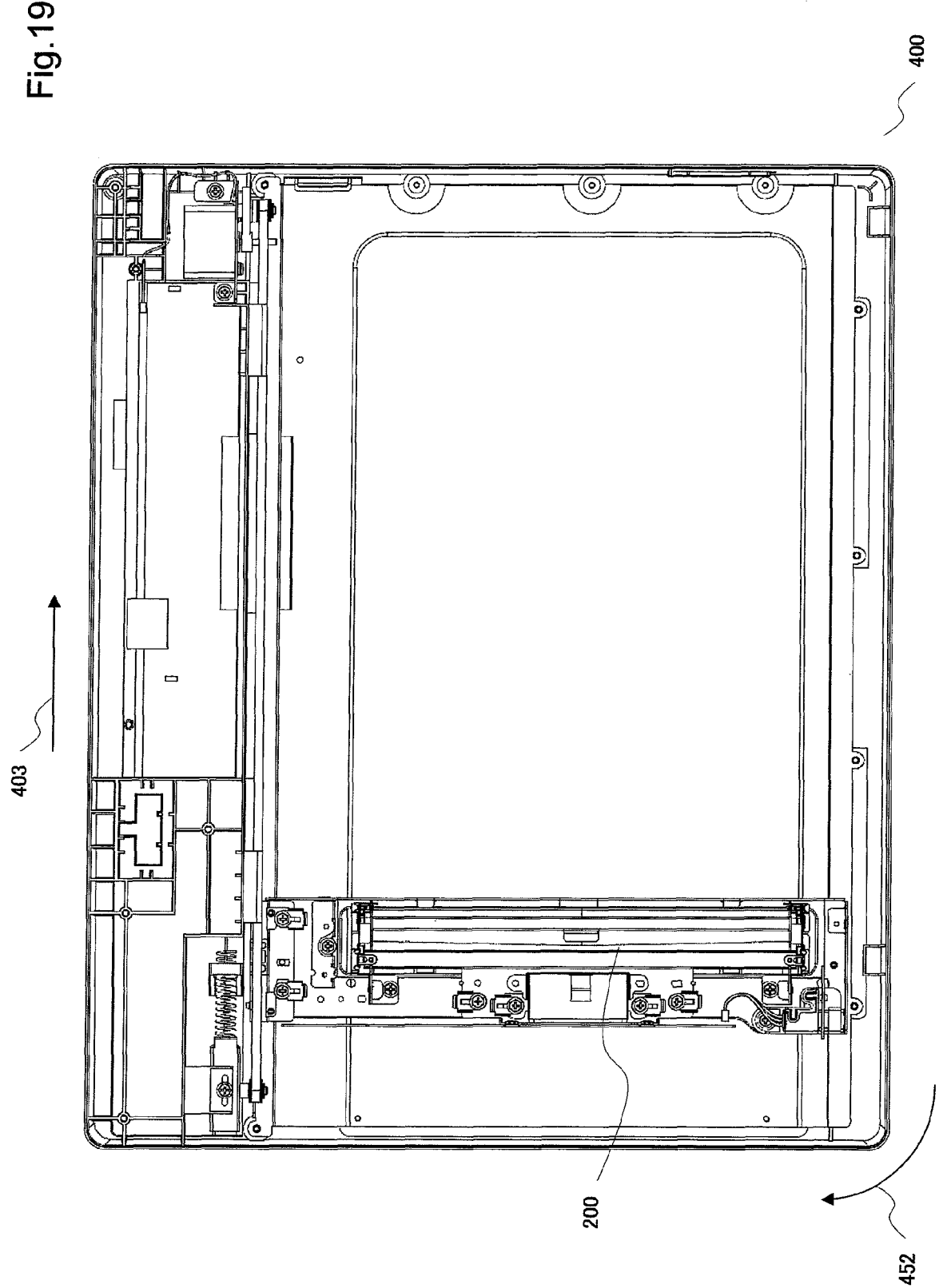
FIG. 19 is an example of a top view of an image reader 400 according to the fourth exemplary embodiment of the present invention.
Figure 20:
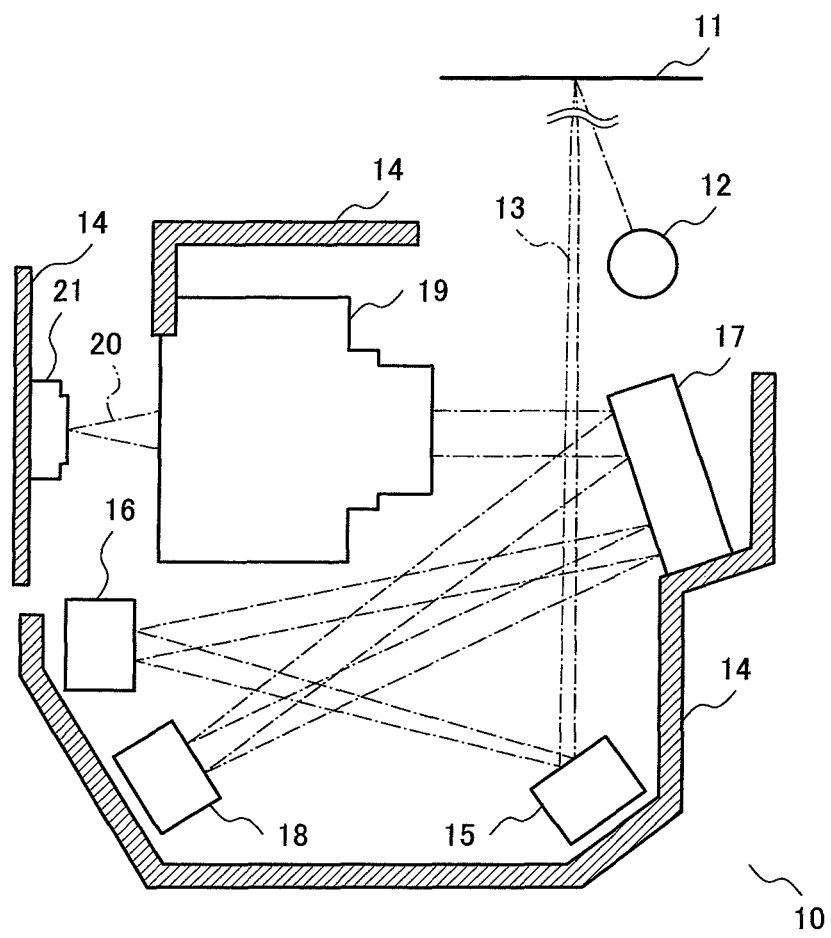
FIG. 20 is an example of a lateral sectional view of an optical module 10 of a related technology of the present invention.
Figure 21:
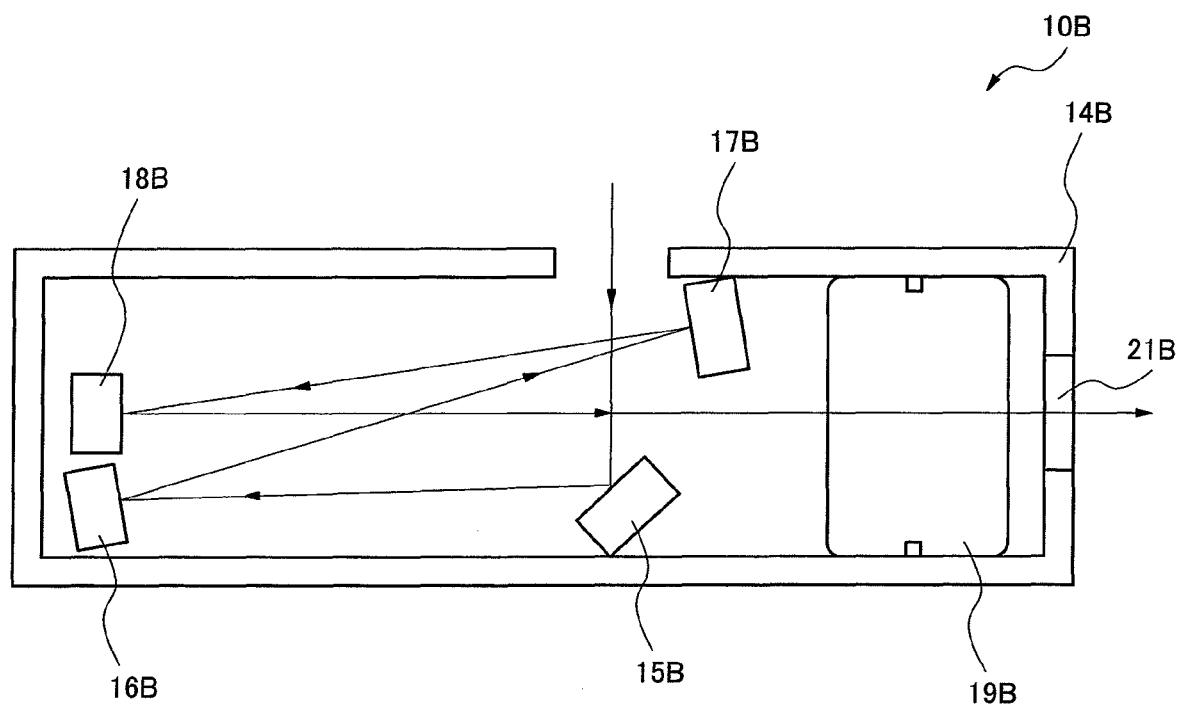
FIG. 21 is an example of a lateral sectional view of an optical module 10B of another related technology of the present invention.

FIG. 19 shows an example of a top view of the image reader 400 in a state of including the optical module 200. Here, when moving the optical module 200 in the secondary scanning direction (arrow 403), a prescribed moment of rotation is generated in the optical module 200. In FIG. 19, the moment of rotation which is generated with a movement of the optical module 200 is shown by an arrow 452. The image reader 400 according to this exemplary embodiment absorbs the moment of rotation 452 with two sets of slider pairs. By absorbing the moment of rotation 452 with two sets of slider pairs, the optical module 200 can be moved in the secondary scanning direction stably in a state of maintaining a vertical direction to the guide rail 402. Further, in order to absorb the moment of rotation 452, it is desirable to install two sets of slider pairs in positions as distant as possible.

As stated above, the image reader 400 according to this exemplary embodiment includes the optical module 200 formed small described in the second exemplary embodiment. Accordingly, the image reader 400 can be miniaturized. Also, by holding the guide rail 402 between two sets of slider pairs, the optical module 200 can be moved smoothly and stably along the guide rail 402.

Further, as a moving mechanism of the optical module 200, there is a technology using a shaft and a shaft receiving component. When a moving mechanism using the shaft and the shaft receiving component and a moving mechanism using two sets of slider pairs are compared, the moving mechanism using two sets of slider pairs is more robust against the moment of rotation 452 than the moving mechanism using the shaft and the shaft receiving component. Accordingly, the moving mechanism of this exemplary embodiment can perform more stable operation compared with the moving mechanism using the shaft and the shaft receiving component and also has higher durability.

Further, in case the moving mechanism using the shaft and the shaft receiving component is used, because the shaft having a high linearity is expensive and also the shaft receiving component is required, cost of the image reader 400 becomes higher. Accordingly, by adopting the moving mechanism using two sets of slider pairs, cost of the image reader 400 can be made low. Also in case only one side of the optical module 200 is connected to the guide rail 402, space-saving of the image reader 400 can be achieved compared with a case where shaft receiving components are arranged on both sides of the optical module 200.

Other Exemplary Embodiments

In an optical module 200 according to the above-mentioned exemplary embodiment, although four reflective mirrors are used, configuration is not limited to this. Number of reflective mirrors and their arrangement can be set appropriately. Further, according to the above-mentioned exemplary embodiment, although two reflective mirrors reflect a ray of light at two positions, configuration is not limited to this. Only one reflective mirror may reflect the ray of light at two positions or three reflective mirrors may reflect the ray of light at two positions. Also the ray of light may be reflected at three positions on a reflective mirror. In this case, an optical path length can be made even longer within a limited space.

Further, the above-mentioned image reader can be used being included in a facsimile machine, a multifunction printer or the like. Further, although an area for reading a manuscript is not described in detail, a general method such as performing a short scan in case a size of the manuscript is small can be used.

Further, a movement of an optical module may not use a motor necessarily. For example, a sheet of manuscript put on top of a desk can be scanned manually.

Further, an optical module according to other exemplary embodiments includes: (a) a light source which irradiates a reading surface of a manuscript, (b) a reading device whose photoelectric conversion surface is arranged at a prescribed distance in a vertical direction to a reading surface of the manuscript, (c) an optical lens which opposes this reading device and forms an image of a reflected light from the manuscript, and (d) a reflective mirror group which is arranged within a specific space area located in an entering side of this optical lens, with a first reflective mirror being arranged so that an optical path to a first reflective mirror into which a reflected light from the manuscript first enters may intersect with an optical axis of the optical lens, and with a second reflective mirror being arranged so that an optical path in which this reflected light by a first reflective mirror reaches a second reflective mirror may intersect with an optical axis of the optical lens, and consists of a plurality of reflective mirrors as a whole.

Moreover, an image reader according to other exemplary embodiments includes: (a) the above-mentioned optical module, and (b) a module movement means which moves this optical module within a plane parallel to a reading surface of a manuscript in a secondary scanning direction.

An image reader according to other exemplary embodiments further includes: (a) an optical module which scans a manuscript in a main scanning direction and reads the image, (b) a guide rail which is arranged singly in a secondary scanning direction of the optical module, (c) a slider made of resin which is arranged on one side part in a main scanning direction within the optical module and slides contacting both side parts of the guide rail, and (d) a driving means which gives force to the optical module to move in the secondary scanning direction via the slider made of resin.

Moreover, an assembling method of an optical module according to other exemplary embodiments further includes: (a) a reflective mirror installation step which installs a plurality of reflective mirrors on a frame made of metal keeping a prescribed positional relation, (b) an optical lens installation step which installs an optical lens into which reflected light of a reflective mirror, which is among reflective mirrors installed in the reflective mirror installation step and into which reflected light from a manuscript finally enters, enters in a lens bracket, and (c) a module assembling step which installs a metal frame made of metal which is installed by the reflective mirror installation step, a lens bracket which is installed by the optical lens installation step, and a reading device substrate which holds a reading device on a prescribed surface which is a reference surface.

Although the present invention has been described with reference to each above-mentioned exemplary embodiment, the present invention is not limited to each above-mentioned exemplary embodiment. Various changes can be made in the composition and details of the present invention within the scope of the present invention. Further, the present invention includes those which combine part or all of the structure of each of the above-mentioned exemplary embodiments mutually and appropriately.

Here, when an optical module of patent document 2 is used, in order to secure an optical path length from a manuscript to an optical lens unit, it is necessary to arrange several reflective mirrors separated in horizontal direction. In this case, although lowering a height of an optical module is possible, length in a horizontal direction becomes large.

Further, in order to avoid increase of the optical module in weight, a housing made of resin is generally used. However, in case of the housing made of resin, the housing expands or shrinks by a temperature change. When the housing expands or shrinks, positional relation among a plurality of reflective mirrors arranged inside changes minutely, and by a change of an optical path, an image of a manuscript read by a CCD is degraded. Further, when a glass fiber is added to resin in order to make an expansion coefficient smaller, cost becomes higher.

In contrast, an optical module according to the present invention is divided into an optical path unit and an image processing unit, and each of them is fixed to a module stay independently. In this case, an optical path can be set with a high degree of accuracy in a state of securing an optical path length sufficiently. Further, by forming a module stay out of metal, degradation of an image by heat can be avoided.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. An optical module comprising:
   an optical path unit including a plurality of reflectors for securing an optical path of reflected light from a manuscript;
   an image processing unit including a reading device which reads image information on said manuscript based on said reflected light from said manuscript entered via said optical path; and
   a connecting component which connects said optical path unit and said image processing unit so that their positional relation will become a prescribed state,
   wherein said optical path unit further comprises a first holding component that holds said plurality of reflectors,
   said image processing unit further comprises a second holding component that holds said reading device, and
   said first holding component and said second holding component are connected to said connecting component, and
   wherein said first holding component, said second holding component and said connecting component are formed out of metal,
   an elongated hole for adjusting positional relation between said optical path unit and said image processing unit is formed on said second holding component, and
   said second holding component is connected to said connecting component via said elongated hole for adjusting positional relation.

2. The optical module according to claim 1, wherein at least one among said plurality of reflectors reflects said reflected light at least twice.

3. The optical module according to claim 1, wherein said image processing unit further comprises an optical lens which forms an image of said reflected light entered from said optical path unit on said reading device and a third holding component made of metal that holds said optical lens, an elongated hole for adjusting a distance between said optical path unit and said image processing unit is formed on said third holding component, and said third holding component is connected to said connecting component via said elongated hole for adjusting a distance.

4. The optical module according to claim 1, wherein said optical module further comprises a light source unit including a light source which irradiates said manuscript on said optical module.

5. An image reader comprising:
an optical module according to claim 1;
a first and a second smoothing component fastened to one end part of said optical module; and
a guide rail arranged between said first and second smoothing component;
wherein said first and second smoothing component hold said guide rail in between cooperatively.

6. The image reader according to claim 5, wherein said first smoothing component and said second smoothing component include a planar part formed out of resin respectively, and said guide rail is held between said two planar parts.

7. The image reader according to claim 5 further comprising:

a third smoothing component which is fastened at a position separated for a prescribed distance away from said first smoothing component of said optical module; and a fourth smoothing component which is fastened at a position for said prescribed distance away from said second smoothing component of said optical module;

wherein said guide rail is held by no less than two sets of said smoothing components.

8. An assembling method of an optical module comprising:
connecting a first holding component that holds a plurality of reflectors for securing an optical path of reflected light from a manuscript to a connecting component; and connecting a second holding component that holds a reading device which reads image information on said manuscript based on said reflected light from said manuscript entered via said optical path to a connecting component so that a positional relation between said optical path and said reading device becomes a prescribed state; and forming, on said second holding component, an elongated hole for adjusting positional relationship between said first holding component and said second holding component, wherein said first holding component, said second holding component and said connecting component are formed out of metal, and said second holding component is connected to said connecting component via said elongated hole for adjusting positional relation.

\* \* \* \* \*